S. R. Pinckney,
Fruit Jar Lifter.

No. 112,955. Patented Mar. 21, 1871.

Witnesses
E. F. Kastenhuber
C. Wahlers

Inventor:
Stephen R. Pinckney
pr
Van Santvoord & Hauff
atts

United States Patent Office.

STEPHEN R. PINCKNEY, OF NEW YORK, N. Y.

Letters Patent No. 112,955, dated March 21, 1871.

IMPROVEMENT IN LIFTERS FOR FRUIT-JARS.

The Schedule referred to in these Letters Patent and making part of the same.

*To all whom it may concern:*

Be it known that I, STEPHEN R. PINCKNEY, of the city, county, and State of New York, have invented a new and Improved Lifter for Fruit-Jars; and I do hereby declare the following to be a full, clear, and exact description thereof, which will enable those skilled in the art to make and use the same, reference being had to the accompanying drawing forming part of this specification, in which drawing—

Similar letters indicate corresponding parts.

This invention relates to apparatus for handling fruit-jars while heating their contents for preservation, and It consists in a shallow box having a bottom of wood or other suitable material, and provided with movable bails turning in the edge or rim of the box, the bails being interlocked with a slotted handle in such a manner that the bails are brought against the jar when the handle is raised to lift the apparatus, and are allowed to spread apart and release the jar when the handle is dropped.

The letter A designates a shallow box, to whose edge or rim, on opposite sides, are hinged bails, B B, which are so formed as to be capable of being turned up against the sides of the jar, can, or other article resting on the box; or the bail can be made long enough to come over the top of the jar O, as in this example.

I make the bottom C of the box of wood or other suitable soft material, which will not expose the jars to be cracked from the effect of violent contact with the bottom, or from sudden shocks of the box on the bottom of the vessel in which the jars may be placed to heat their contents.

I prefer a wooden bottom for this reason, and upon the ground of economy and ease of construction, and for the reason, also, that wood is a poor conductor of heat, and the jar will not be so likely to receive injury or become cracked by reason of difference of temperature, as would be the case if metal or other good conducting material were used in making the bottom of the box, since the wooden box will not soon become highly heated by repeated immersions in the hot water or liquid used for heating the contents of jars or cans.

The bottom of the box and the sides or rim D are so connected to each other as to leave interstices through which water can run out when the apparatus is lifted out, and, if preferred, the bottom of the box can be perforated for that purpose; or the bottom can be made of slats of wood, arranged so as to form a proper surface for the jar to rest upon.

The bails B B are interlocked with a handle, E, which is provided at its outer end with a hook, F, to hook over the edge of the vessel that contains the hot water or liquid for heating the contents of the jar; or the hook can be used to suspend the apparatus upon slats or bars placed across the mouth of the vessel.

Figure 1:
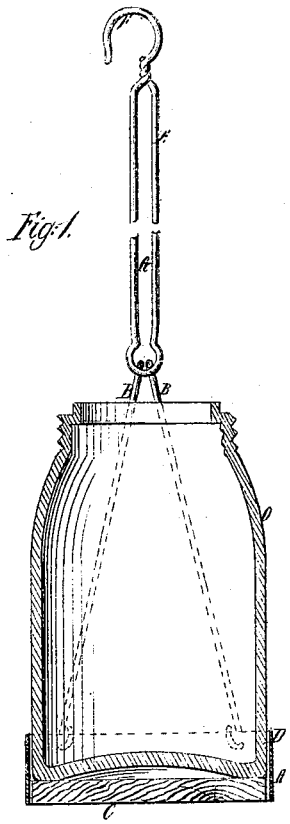
Figure 1 is a vertical section of my apparatus, showing also a fruit-jar, the lifter being closed in readiness to move the jar.
Figure 2:
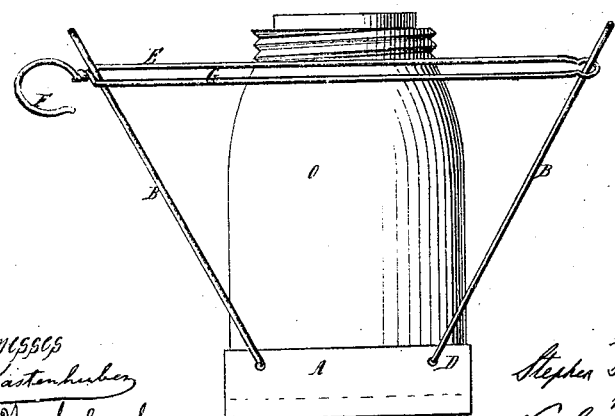
Figure 2 is an elevation showing the apparatus in an open condition, to allow the jar to be taken out.

The handle E is provided with a slot or opening, G, through which the bails are free to move, the slot being made in length equal, at least, to the distance apart of the hinges of the two bails from each other, so that when the handle is moved toward one side of the jar it can slide down over the "side" portions of the bails, as is shown in fig. 2, when, the bails being no longer drawn together by the end of the slot of the handle, are free to fall asunder, and the jar or can may be removed from the apparatus.

When the apparatus is to be used for immersing a jar, the jar is placed in the box, the handle is raised alongside of the jar so as to elevate the bails, when the handle is turned with its hook upward, and the bails are clustered in the bottoms of the slot of the handle, when the handle can be slid over the center of the jar so as to enable one to lift the jar and box squarely from the ground.

The bails and handle can be made of wire, as is shown in the present example.

What I claim as new, and desire to secure by Letters Patent, is—

The box A, provided with bails B B and a slotted handle, E, combined and arranged substantially as and for the purpose described.

STEPHEN R. PINCKNEY.

Witnesses:
 WM. S. CARR,
 JOHN L. MASON.